United States Patent
Hara et al.

[11] Patent Number: 5,632,808
[45] Date of Patent: May 27, 1997

[54] CANISTER

[75] Inventors: Takeshi Hara; Kazumi Yamazaki; Teruo Wakashiro; Takeaki Nakajima; Shoichi Hokazono, all of Wako, Japan

[73] Assignee: Honda Giken Kogyo Kabushiki Kaisha, Tokyo, Japan

[21] Appl. No.: 622,834

[22] Filed: Mar. 27, 1996

[30] Foreign Application Priority Data

Mar. 30, 1995 [JP] Japan .................... 7-072936

[51] Int. Cl.$^6$ .................................... B01D 53/04
[52] U.S. Cl. .................... 96/137; 96/139; 96/149; 96/152; 123/519
[58] Field of Search .............. 96/108, 121, 134, 96/137–141, 149–152; 123/519–521

[56] References Cited

U.S. PATENT DOCUMENTS

| | | | |
|---|---|---|---|
| 2,586,670 | 2/1952 | Lambertsen | 96/149 |
| 4,203,401 | 5/1980 | Kingsley et al. | 123/520 |
| 4,338,106 | 7/1982 | Mizuno et al. | 96/139 |
| 4,496,379 | 1/1985 | Kozawa | 96/137 X |
| 4,507,132 | 3/1985 | Yoshida | 96/139 |
| 5,002,596 | 3/1991 | Moskaitis et al. | 96/152 |
| 5,098,453 | 3/1992 | Turner et al. | 96/149 |
| 5,207,808 | 5/1993 | Haruta et al. | 96/139 X |
| 5,408,976 | 4/1995 | Reddy | 123/519 |
| 5,501,723 | 3/1996 | Andress et al. | 96/152 X |
| 5,538,542 | 7/1996 | Watanabe et al. | 96/152 X |
| 5,538,543 | 7/1996 | Watanabe et al. | 96/152 X |

FOREIGN PATENT DOCUMENTS

| | | | |
|---|---|---|---|
| 0556488 | 8/1993 | European Pat. Off. | 123/519 |
| 5-133287 | 5/1993 | Japan | 123/519 |
| 6-280693 | 10/1994 | Japan | 123/519 |

Primary Examiner—Robert Spitzer
Attorney, Agent, or Firm—Nikaido Marmelstein Murray & Oram LLP

[57] ABSTRACT

A canister includes a partition wall which extends toward the lid member with one end thereof connected to the end wall and opposite sides are connected to an inner surface of the casing body. First and second adsorbent layers, formed by an adsorbent, are retained between first and second filters and a third filter, respectively. The first and second filters are fixedly disposed on opposite sides of the partition wall to define first and second chambers between the first and second filters and the end wall, respectively. The third filter is placed and carried on an inner surface of a support plate which is fitted in the casing body and which has a large number of communication bores. The support plate and a lid member are biased by a spring in a direction to compress the first and second adsorbent layers. An inclination inhibiting portion is provided on at least one of the casing body and the partition wall on the opposite side from the third chamber with respect to the third filter and the support plate at a distance from the third filter which substantially corresponds to a distance between the third filter and the partition wall. Thus, it is possible to prevent a reduction in adsorbing efficiency by preventing the third filter and support plate from inclining.

13 Claims, 8 Drawing Sheets

CANISTER

BACKGROUND OF THE INVENTION

1. Field of the Invention

The present invention relates to a gas adsorbing canister.

2. Description of the Related Art

A known gas adsorbing canister includes a casing having a casing body, formed into a bottomed tubular shape with an end wall at one end thereof, and a lid member for closing the other end of the casing. A partition wall extends toward the lid member. One end of the partition wall is connected to the end wall. Opposite sides of the partition wall are connected to an inner surface of the casing body. First and second filters are fixedly disposed within the casing body on opposite surfaces of the partition wall. First and second chambers are defined between the first and second filters and the end wall, respectively. A third filter is superposed and carried on an inner surface of a support plate which is fitted to the other end of the casing body. The support plate has a large number of communication bores which permit a gas to flow therethrough. The third filter is disposed at a distance from the other end of the partition wall. First and second adsorbent layers are formed by adsorbents. The first and second adsorbent layers are retained between the first and second filters and the third filter, respectively. A spring is accommodated within a third chamber. The third chamber is defined between the support plate and the lid member. The spring biases the support plate in a direction to compress the first and second adsorbent layers.

Such a canister is conventionally constructed as shown in FIG. 12. Specifically, the first and second adsorbent layers 29 and 30 are resiliently retained between the first and second filters 24 and 25 and the third filter 28 by a spring force of the spring 32. Therefore, when the adsorbent, such as activated carbon, is finely pulverized by vibration or the like, the generation of a vacant space, due to a reduction in volume of each of the adsorbent layers 29 and 30, can be prevented, thereby avoiding a reduction in adsorbing efficiency of the canister.

In the above conventional structure, however, because of different cross-sectional areas of the first and second adsorbent layers 29 and 30, the support plate 27 and the third filter 28 may be inclined from a normal state, shown by a dashed line, toward the adsorbent layer of the larger cross-sectional area, i.e., toward the first adsorbent layer 29 at a fulcrum provided at a point corresponding to the other end of the partition wall 19. If such an inclination tendency is increased, a gap is created between the support plate 27, the third filter 28 and the inner surface of the casing body 17. The adsorbent is dropped through the gap into the third chamber 31. Such a phenomenon is liable to be produced by the expansion of the casing body resulting from the pressurization of the inside of the casing body 17. The production of such a phenomenon brings about a reduction in adsorbing efficiency of the canister.

There is a conventionally known canister of a construction in which a plurality of springs are accommodated and disposed in the third chamber 31, so that spring forces are equally applied to adsorbent layers 29 and 30. Even in such a construction, the inclination of the third filter 28 and the support plate 27 cannot be prevented.

SUMMARY OF THE INVENTION

Accordingly, it is an object of the present invention to provide a canister constructed so that the inclination of the third filter and the support plate is avoided to prevent a reduction in adsorbing efficiency.

To achieve the above object, according to a first aspect and feature of the present invention, there is provided a canister, comprising: a casing which includes a casing body formed into a bottomed tubular shape having an end wall at one end thereof, and a lid member for closing the other end of the casing. A partition wall extends toward the lid member. One end of the partition wall is connected to the end wall. Opposite sides of the partition wall are connected to an inner surface of the casing body. First and second filters are fixedly disposed within the casing body on opposite sides of the partition wall. First and second chambers are defined between the first and second filters and the end wall, respectively. A third filter is superposed and is carried on an inner surface of a support plate which is fitted to the other end of the casing body. The support plate has a large number of communication bores which permit gas to flow. The third filter is disposed at a distance from the other end of the partition wall. First and second adsorbent layers, which are formed by adsorbents, are retained between the first and second filters and the third filter, respectively. A spring is accommodated within a third chamber defined between the support plate and the lid member. The spring biases the support plate in a direction which compresses the first and second adsorbent layers. At least one of the casing body and the partition wall has an inclination inhibiting portion provided thereon on the opposite side from the third chamber with respect to the third filter and the support plate such that a distance between the inclination inhibiting portion and the third filter substantially corresponds to a distance between the third filter and the partition wall.

With the first feature of the present invention, even if the third filter and the support plate are about to be inclined around a fulcrum at a point corresponding to the partition wall, such an inclination is inhibited by the inclination inhibiting portion. Thus, it is possible to prevent a reduction in adsorbing efficiency due to the adsorbent falling into the third chamber.

According to a second aspect and feature of the present invention, in addition to the first feature, the casing body is formed from a synthetic resin. The inclination inhibiting portion is formed on and protruded from the inner surface of the casing body over the entire length thereof such that a protruding amount of the inclination inhibiting portion is larger as it approaches the partition wall.

With the second feature of the present invention, when the casing body is formed in a mold, it is easy to draw the mold downwardly.

The above and other objects, features and advantages of the invention will become apparent from the following detailed description of preferred embodiments taken in conjunction with the accompanying drawings.

DETAILED DESCRIPTION OF THE PREFERRED EMBODIMENTS

The present invention will now be described by way of preferred embodiments with reference to the accompanying drawings.

Figure 1:
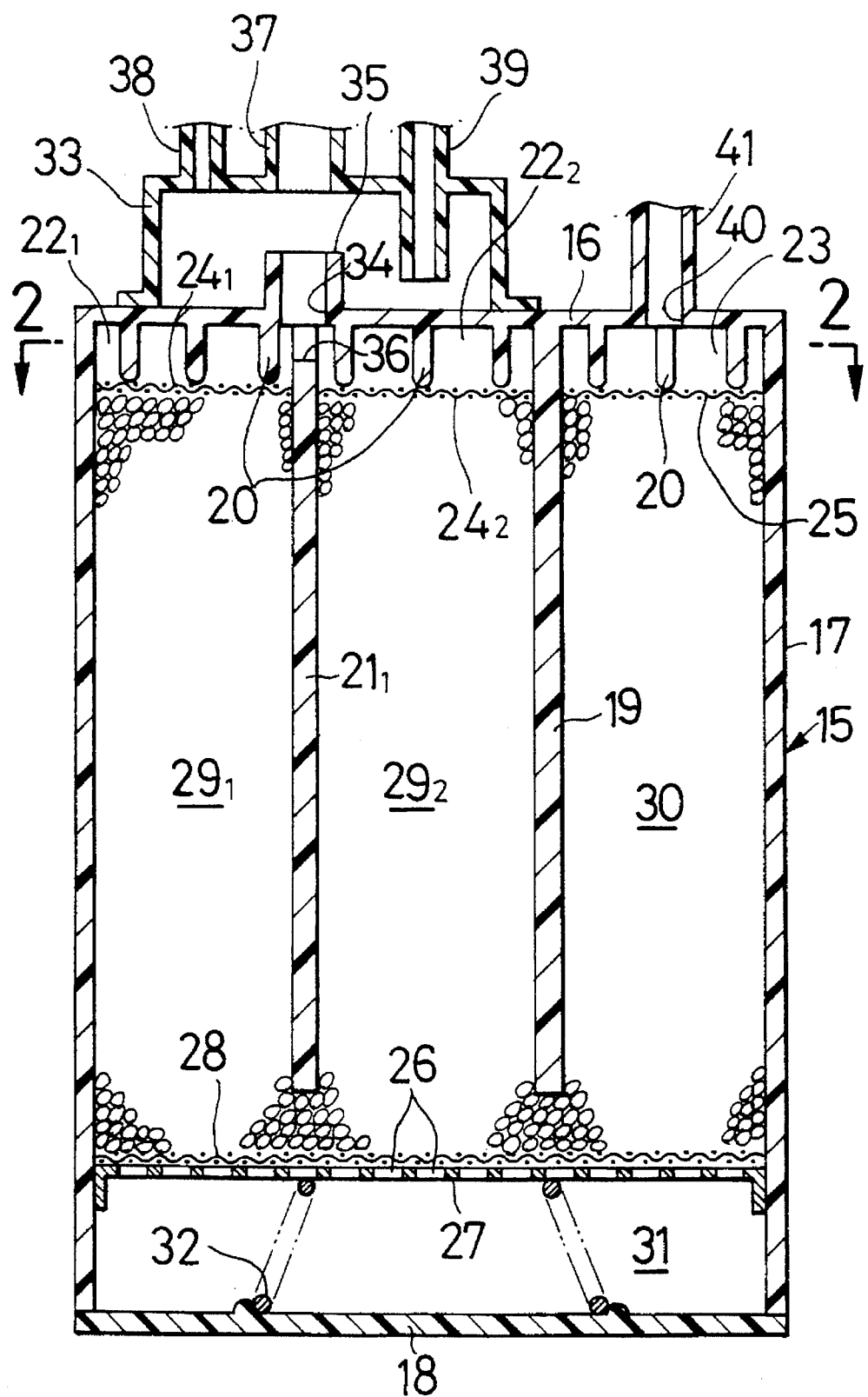
FIG. 1 is a vertical sectional view of a canister according to a first embodiment of the present invention.

FIG. 1 shows a canister according to a first embodiment of the present invention. The canister has a casing 15 which is formed from a synthetic resin and includes a casing body 17 which is formed into a bottomed polygonal tubular shape and is provided an its one end with an end wall 16. The casing 15 also includes a lid member 18 which is coupled to the other end of the casing body 17 to close the other end of the casing body 17.

Figure 2:
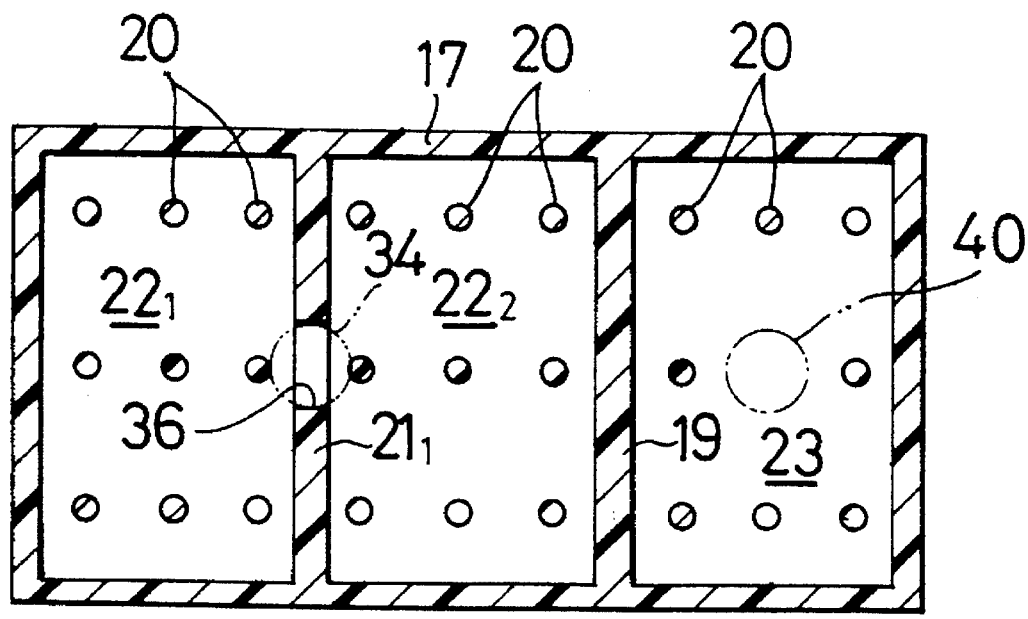
FIG. 2 is a sectional view taken along a line 2—2 in FIG. 1.

Referring to FIG. 2 in addition to FIG. 1, the cross section of the casing body 17 is formed into a rectangular shape. A partition wall 19 is integrally connected at its opposite sides to an inner surface of the casing body 17. The partition wall 19 is integrally connected at its one end to the end wall 16 at right angles and extends toward the lid member 18. The inside of the casing body 17 is divided by the partition wall 19 into a zone having a large cross-sectional area (a left zone as viewed in FIG. 1), and a zone having a small cross-sectional area (a right zone as viewed in FIG. 1). A plurality of support pins 20 are integrally provided in a projecting manner on an inner surface of the end wall 16.

A wall-like inclination inhibiting portion $21_1$ is integrally connected at its opposite sides to the inner surface of the casing body 17 and extends in parallel to the partition wall 19 to substantially bisect the larger cross-sectional area zone defined by the partition wall 19. One end of the inclination inhibiting portion $21_1$ is connected to the end wall 16 at right angles, while the other end of the inclination inhibiting portion $21_1$ is disposed at substantially the same position as the other end of the partition wall 19.

A pair of first filters $24_1$ and $24_2$ is inserted into and disposed in the casing body 17 on one side of the partition wall 19 to define a pair of first chambers $22_1$ and $22_2$ separated from each other by the inclination inhibiting portion $21_1$. The pair of first chambers are disposed between the first filters $24_1$ and $24_2$ and the end wall 16, respectively. The pair of first filters are supported by the plurality of support pins 20. A second filter 25 is inserted into and disposed in the casing body 17 on the other side of the partition wall 19 to define a second chamber 23 between the second filter 25 and the end wall 16. The second filter 25 is supported by the plurality of support pins 20.

A support plate 27, formed into a quadrangle shape, is fitted in the other end of the casing body 17 and has a large number of communication holes 26 which permits a gas to flow therethrough. A third filter 28 is superposed and carried on an inner surface of the support plate 27 at a distance which is spaced apart from the other ends of the partition wall 19 and the inclination inhibiting portion $21_1$.

First adsorbent layers $29_1$ and $29_2$, formed by activated carbon filled as an adsorbent, are retained between the pair of first filters $24_1$ and $24_2$ and the third filter 28, respectively. A second adsorbent layer 30 is formed by activated carbon filled as an adsorbent and is retained between the second and third filters 25 and 28.

A third chamber 31 is defined between the support plate 27 and the lid member 18. A spring 32 is accommodated in the third chamber 31 for biasing the first and second adsorbent layers $29_1$, $29_2$ and 30 is a compressing direction.

A box-like case 33 is secured to an outer surface of the end wall 16 of the casing body 17 to extend astride between the pair of first chambers $22_1$ and $22_2$. A flow bore 34 is provided in the end wall 16 astride between the pair of first chambers $22_1$ and $22_2$. A tubular portion 35 is integrally connected to the end wall 16 to extend within the case 33 in communication with the communication bore 34. A semi-circular notch 36 is provided in that section of one end of the inclination inhibiting portion $21_1$ which corresponds to the communication bore 34. Thus, it is possible to permit gas to flow substantially equally both through the case 33 and through the pair of first chambers $22_1$ and $22_2$.

The following conduits are connected to the case 33: an evaporated fuel conduit 37 for introducing an evaporated fuel generated in a fuel tank (not shown) during supplying of fuel to the fuel tank; and an evaporated fuel conduit 38 for introducing an evaporated fuel generated in the fuel tank during non-supplying of fuel such as during parking or traveling of a vehicle. A purge gas pipe 39, for purging the evaporated fuel adsorbed by the canister to an intake system in an internal combustion engine, is also connected to the case 33 to protrude into the case. An opened bore 40 is provided in the end wall 16 of the casing body 17. An opened pipe 41, connected to the opened bore 40, is connected to the end wall 16 of the casing body 17.

The operation of this embodiment will be described below. In assembling the canister, in a condition in which the lid member 18 has been removed from the casing body 17, and the casing body 17 is in an attitude such that the end wall 16 is turned to a lower position, the pair of first filters $24_1$ and $24_2$ and the second filter 25 are inserted into the casing body 17, so that they are supported by the support pins 20. Then, a predetermined amount of the adsorbent is charged onto the filters $24_1$, $24_2$ and 25. Thereafter, the third filter 28 and the support plate 27 are fitted in mutually superposed states into the other end, i.e., the upper end of the casing body 17. The lid member 18, with the spring 32 interposed between the lid member 18 and the support plate 27, is secured to the casing body 17, thereby completing the assembling of the canister.

In such a canister, the evaporated fuel introduced through the evaporated fuel conduit 37 into the case 33, during supplying of fuel, is introduced substantially equally into the pair of first chambers $22_1$ and $22_2$ via the tubular portion 35, the communication bore 34 and the notch 36. The evaporated fuel is passed through the first filters $24_1$ and $24_2$ and flows within the pair of first adsorbent layers $29_1$ and $29_2$ toward the third chamber 31. The evaporated fuel is passed through the third filter 28 and the support plate 27 into the third chamber 31 and is passed again through the support plate 27 and the third filter 28 into the second adsorbent layer 30, within with it flows toward the second chamber 23. Thus, the evaporated fuel is adsorbed by the adsorbent in the pair of first adsorbent layers $29_1$ and $29_2$ and in the second adsorbent layer 30.

The same flow of the evaporated fuel also applies to the evaporated fuel introduced into the evaporated fuel conduit 38 during non-supplying of fuel such as during parking or traveling of the vehicle. Even in this case, the evaporated fuel is adsorbed by the adsorbent in the pair of first adsorbent layers $29_1$ and $29_2$ and in the second adsorbent layer 30.

During purging of the gas from the canister, air which is introduced through the opened page pipe 41 into the second chamber 23, is passed through the second adsorbent layer 30 and via the third chamber 31 into the pair of first adsorbent layers $29_1$ and $29_2$, and flows toward the first chambers $22_1$ and $22_2$. Thus, the purge gas flows into the first chambers $22_1$ and $22_2$ in a manner that it is entrained on such air. Further, the purge gas is passed from the first chambers $22_1$ and $22_2$ via the notch 36, the flow bore 34 and the tubular portion 35 into the case 33 and is introduced into the intake system in the internal combustion engine by the purge gas pipe 39.

In such a canister, the first adsorbent layers $29_1$ and $29_2$ and the second adsorbent layer 30 are resiliently retained between the first filters $24_1$ and $24_2$ and the third filter 28 and between the second filter 25 and the third filter 28, respectively. Thus, even if the adsorbent such as activated carbon is finely pulverized by vibration or the like, the generation of a vacant space due to a decrease in volume of the adsorbent layers $29_1$ and $29_2$ can be prevented to avoid a reduction in adsorbing efficiency of the canister, because the adsorbent layers $29_1$, $29_2$ and 30 are resiliently retained.

Moreover, by the fact that the inclination inhibiting portion $21_1$, which is spaced apart from the third filter 28 at a distance substantially corresponding to the distance between the third filter 28 and the partition wall 19, is provided in the casing body 17 on the opposite side from the third chamber 31 with respect to the third filter 28 and the support 27, even if the third filter 28 and the support 27 are about to be inclined toward the first adsorbent layers $29_1$ and $29_2$ at a fulcrum provided at a point corresponding to the partition wall 19, such an inclination is inhibited by the inclination inhibiting portion $21_1$. Thus, it is possible to reliably prevent the adsorbent from dropping into the third chamber 31 due to the inclination of the third filter 28 and the support plate 27, thereby maintaining the adsorbing efficiency of the canister.

Figure 3:
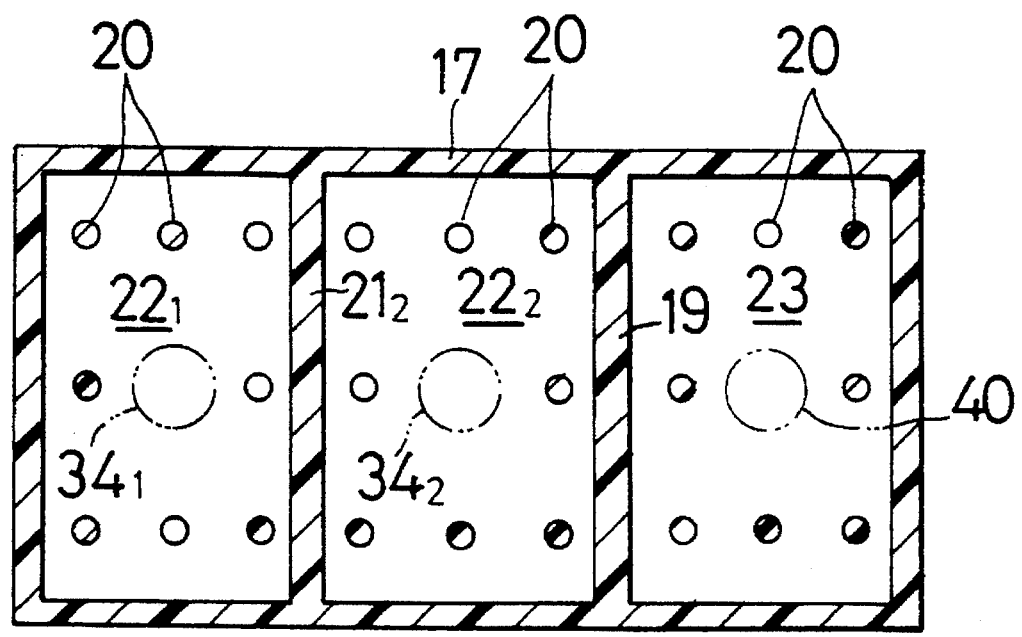
FIG. 3 is a sectional view similar to FIG. 2, but illustrating a first modification to the first embodiment.

In a modification to the first embodiment, an inclination inhibiting portion $21_2$ completely separating the first chambers $22_1$ and $22_2$ from each other may be provided in the casing body 17, as shown in FIG. 3. In this case, flow bores $34_1$ and $34_2$ leading respectively to the first chambers $22_1$ and $22_2$ may be provided in the end wall 16 (see FIG. 1).

Figure 4:
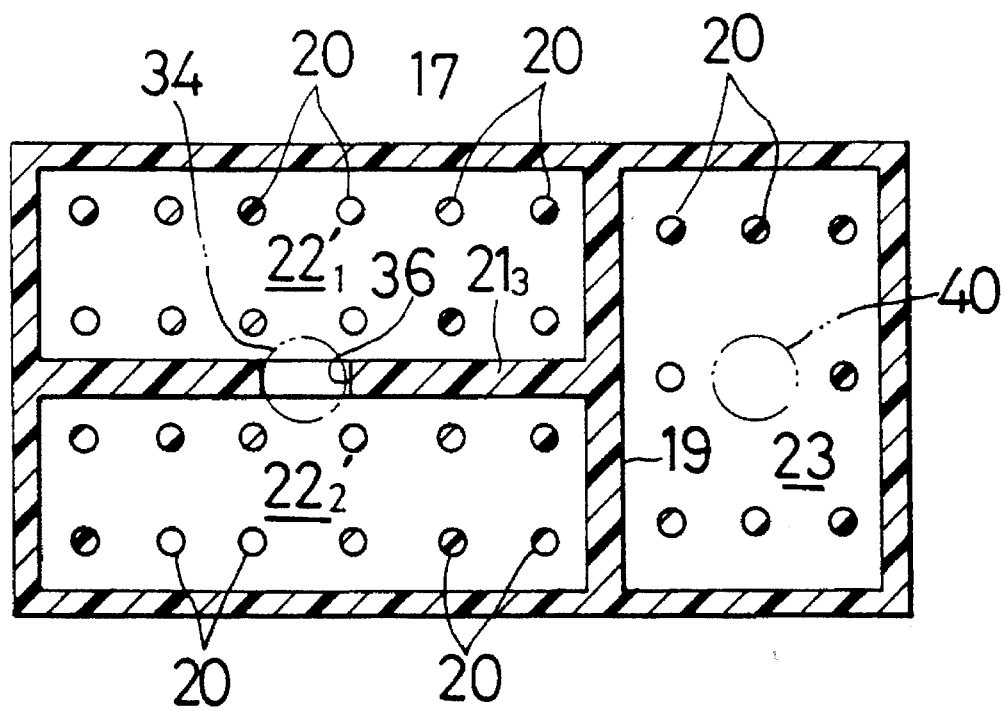
FIG. 4 is a sectional view similar to FIG. 2, but illustrating a second embodiment.

Referring to FIG. 4, there is shown a canister according to a second embodiment of the present invention. In this canister, a wall-like inclination inhibiting portion $21_1$ separates a pair of first chambers $22_1$ and $22_2$ from each other, and is connected at right angles to a partition wall 19 and an inner surface of a casing body 17. A notch 36 is provided in a portion of the inclination inhibiting portion $21_3$ connected to the end wall (see FIG. 1) to correspond to a flow bore 34.

Even in the second embodiment, an effect similar to that in the first embodiment can be provided by the fact that the inclination inhibiting portion $21_3$ and the partition wall 19 are disposed at the same distance spaced apart from the third filter 28 (see FIG. 1).

Figure 5:
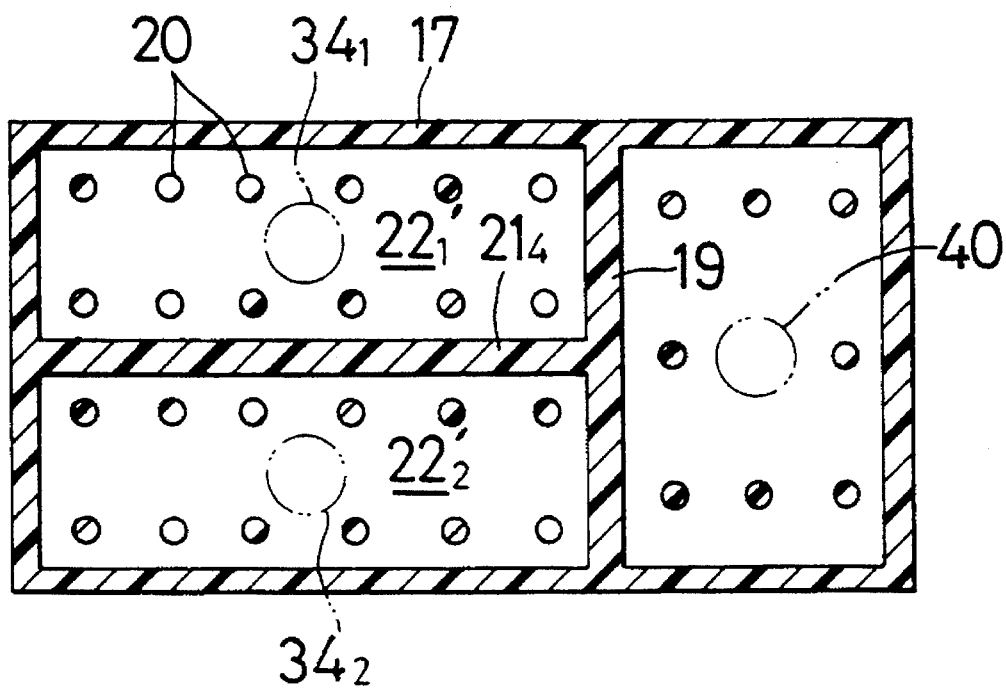
FIG. 5 is a sectional view similar to FIG. 4, but illustrating a modification to the second embodiment.

In a modification to the second embodiment, an inclination inhibiting portion $21_4$ is provided between the casing body 17 and the partition wall 19 are separates first chambers $22_1'$ and $22_2'$ leading to flow bores $34_1$ and $34_2$ from each other, as shown in FIG. 5.

Figure 6:
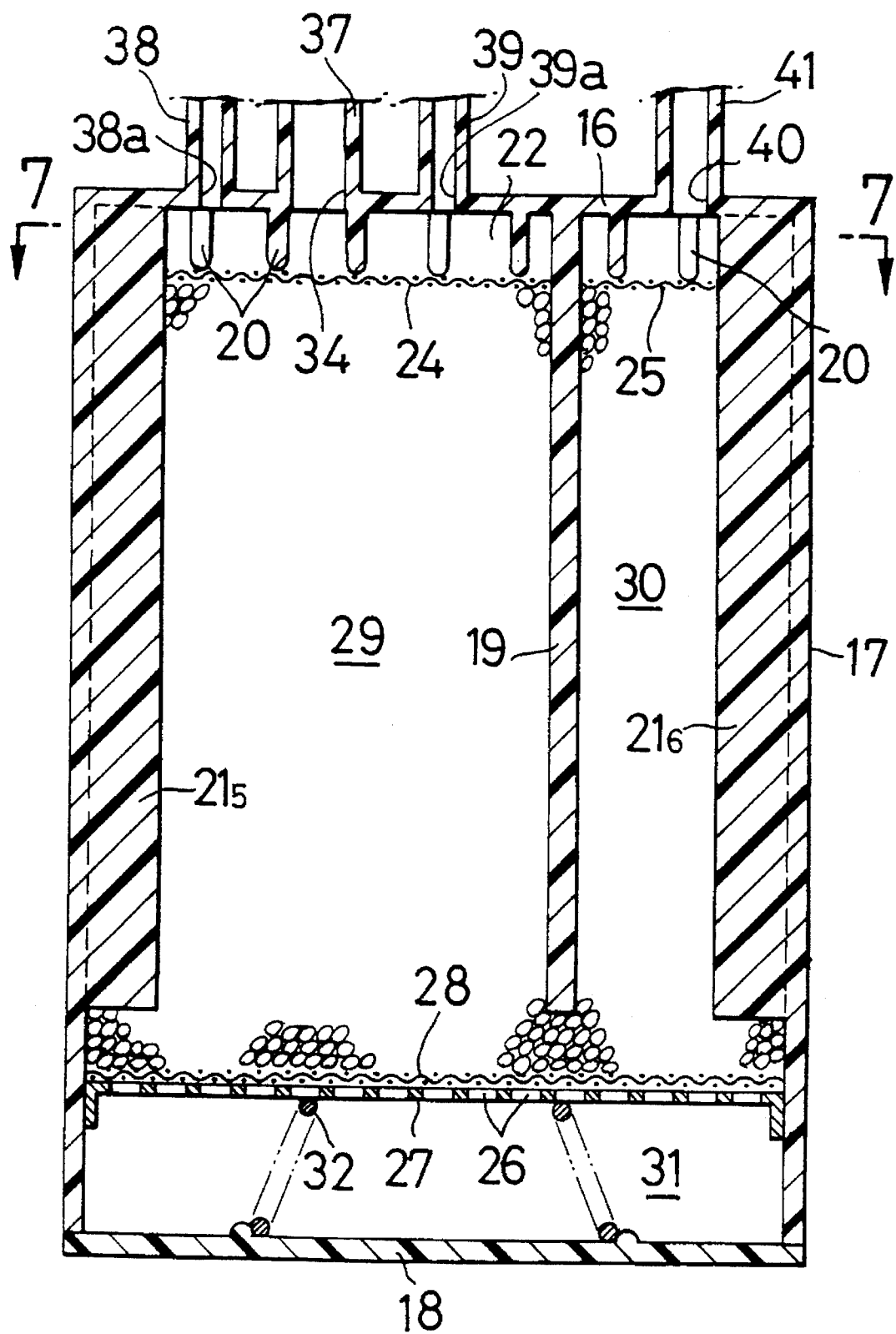
FIG. 6 is a vertical sectional view of a canister according to a third embodiment of the present invention.
Figure 7:
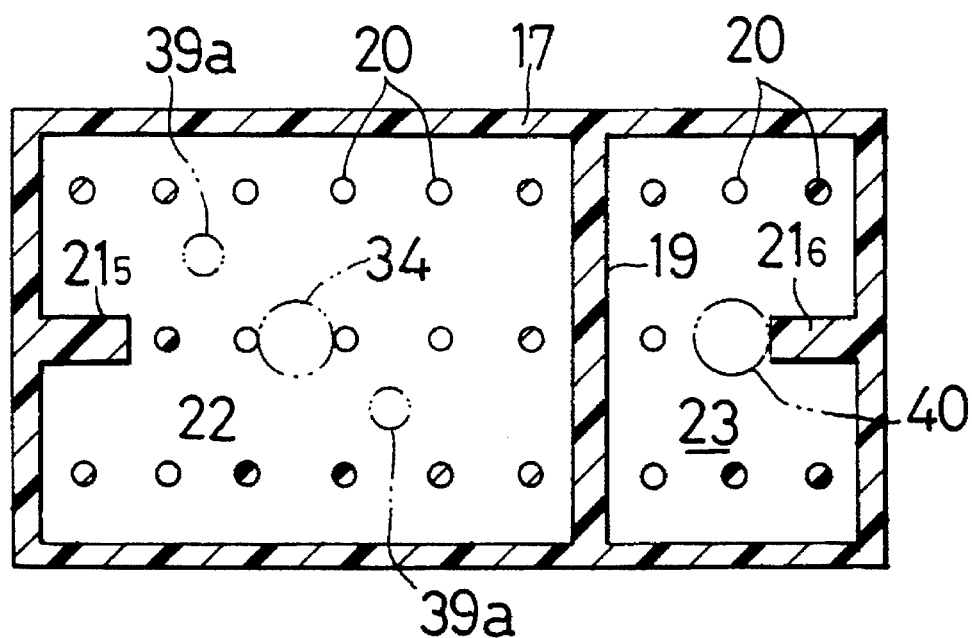
FIG. 7 is a sectional view taken along a line 7—7 in FIG. 6.

FIGS. 6 and 7 show a canister according to a third embodiment of the present invention, wherein portions or components corresponding to those in the above-described embodiments are designated by like reference numerals.

A first filter 24 is inserted into and disposed in the casing body 17 at one side of the partition wall 19 to define a first chamber 22 between the first filter 24 and the end wall 16, and is supported by a plurality of support pins 20. A second filter 25 is inserted into and disposed in the casing body 17 on the other side of the partition wall 19 to define a second chamber 23 between the second filter 25 and the end wall 16, and is supported by the plurality of support pins 20. A first adsorbent layer 29 is retained between the first filter 24 and a third filter 28, and a second adsorbent layer 30 is retained between the second and third filters 25 and 28.

Flow bores 34, 38a and 39a are provided in the end wall 16 of the casing body 17 to lead to the first chamber 22. An evaporated fuel conduit 37 leading to the flow bore 34, and evaporated fuel conduit 38 leading to the flow bore 38a and a purge gas pipe 39 leading to the flow bore 39a are connected to the end wall 16.

In such a canister, an inclination inhibiting portion $21_5$ is integrally connected at right angles to an inner surface of the casing body 17 on the side of the first chamber 22 to protrude toward the partition wall 19. The inclination inhibiting portion $21_5$ extends toward the lid member 18 with one end thereof being connected to the end wall 16. An inclination inhibiting portion $21_6$ is also integrally connected at right angles to the inner surface of the casing body 17 on the side of the second chamber 23 to protrude toward the partition wall 19. The inclination inhibiting portion $21_6$ extends toward the lid member 18 with one end thereof being connected to the end wall 16. Moreover, the other ends of the inclination inhibiting portions $21_5$ and $21_6$ are disposed at locations spaced at substantially the same distance apart from the third filter 28 as the distance between the partition wall 19 and the third filter 28.

Even in the third embodiment, the inclination of the third filter 28 and the support plate 27 is inhibited by the action of the inclination inhibiting portions $21_5$ and $21_6$, and thus, a reduction in adsorbing efficiency is prevented.

If the cross-sectional area of the first adsorbent layer 29 is much larger when compared with the cross-sectional area of the second adsorbent layer 30, the inclination inhibiting portion $21_6$ may be omitted.

Figure 8:
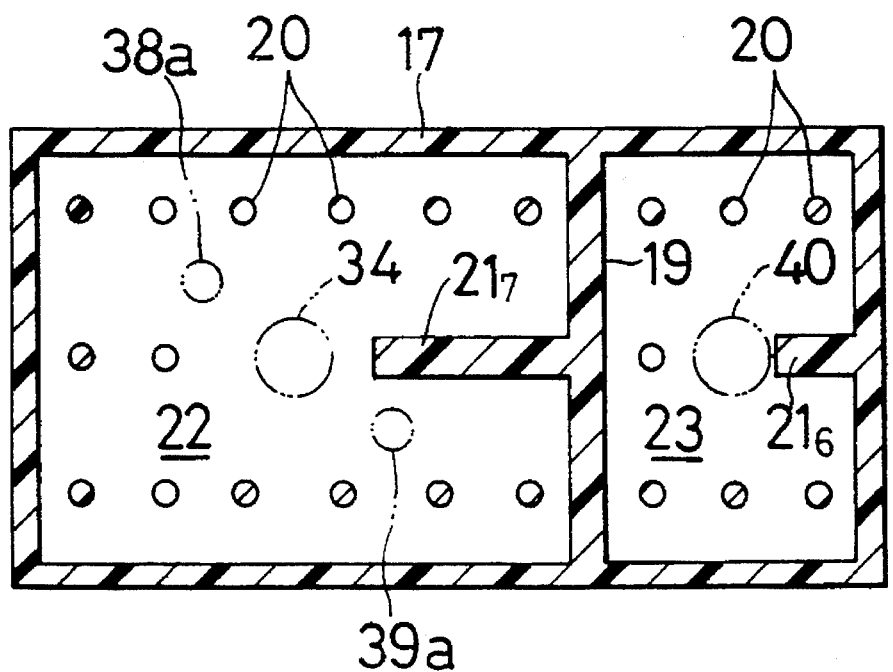
FIG. 8 is a sectional view similar to FIG. 7, but illustrating a first modification to the third embodiment.
Figure 9:
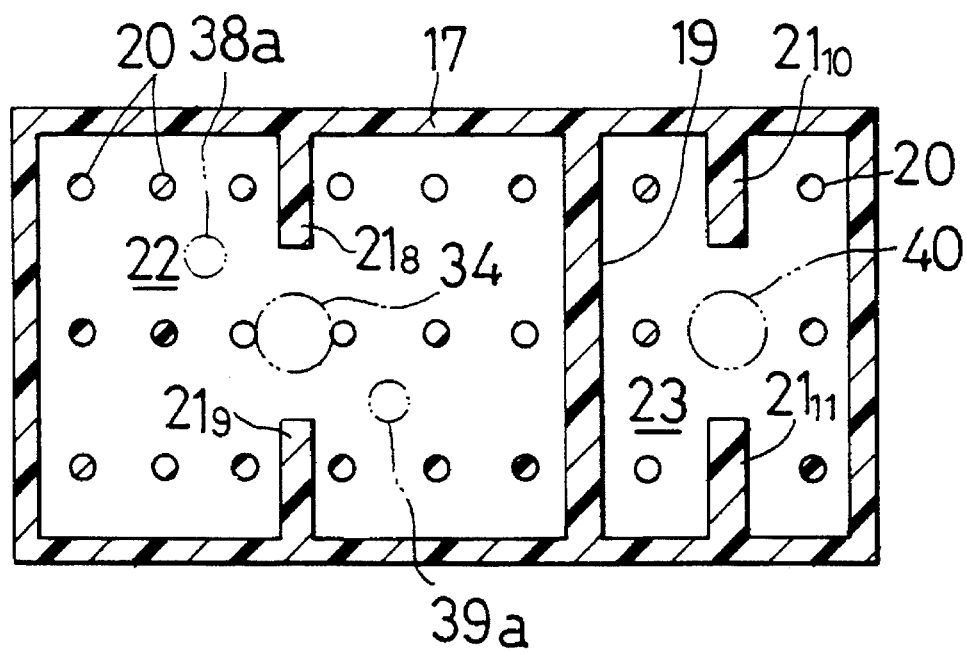
FIG. 9 is a sectional view similar to FIG. 7, but illustrating a second modification to the third embodiment.
Figure 10:
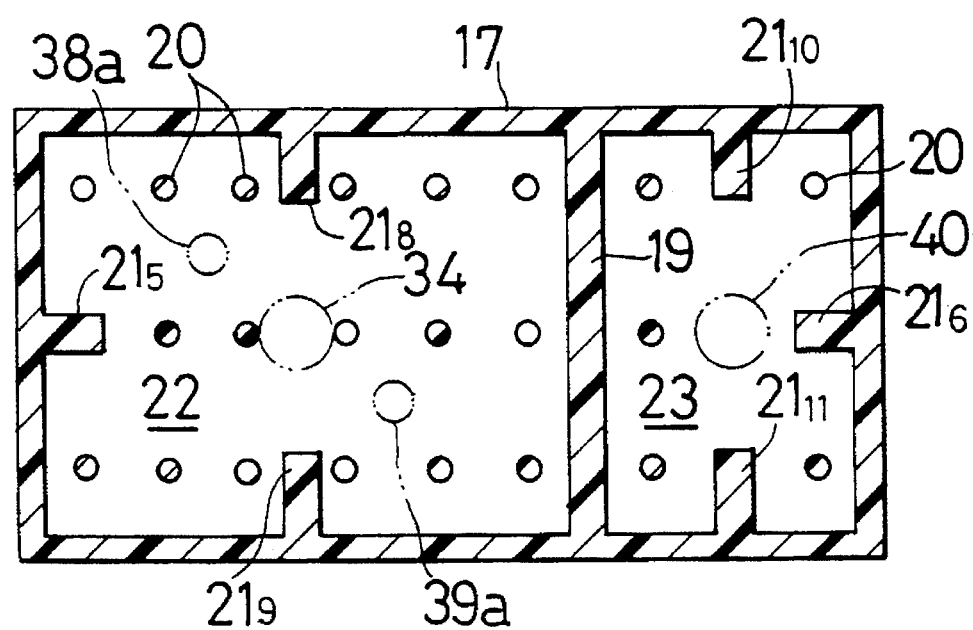
FIG. 10 is a sectional view similar to FIG. 7, but illustrating a third modification to the third embodiment.

In a first modification to the third embodiment, an inclination inhibiting portion $21_7$ may be connected at right angles to the partition wall 19 in place of the inclination inhibiting portion $21_6$ provided in the third embodiment, as shown in FIG. 8. In a second modification, a pair of inclination inhibiting portions $21_8$ and $21_9$ parallel to the partition wall 19 may be connected to the inner surface of the casing body 17 on the side of the first chamber 22, and a pair of inclination inhibiting portions $21_{10}$ and $21_{11}$ parallel to the partition wall 19 may be connected to the inner surface of the casing body 17 on the side of the second chamber 22, as shown in FIG. 9. In a third modification, the third embodiment shown in FIGS. 6 and 7 and second modification shown in FIG. 9 may be combined with each other, as shown in FIG. 10.

Figure 11:
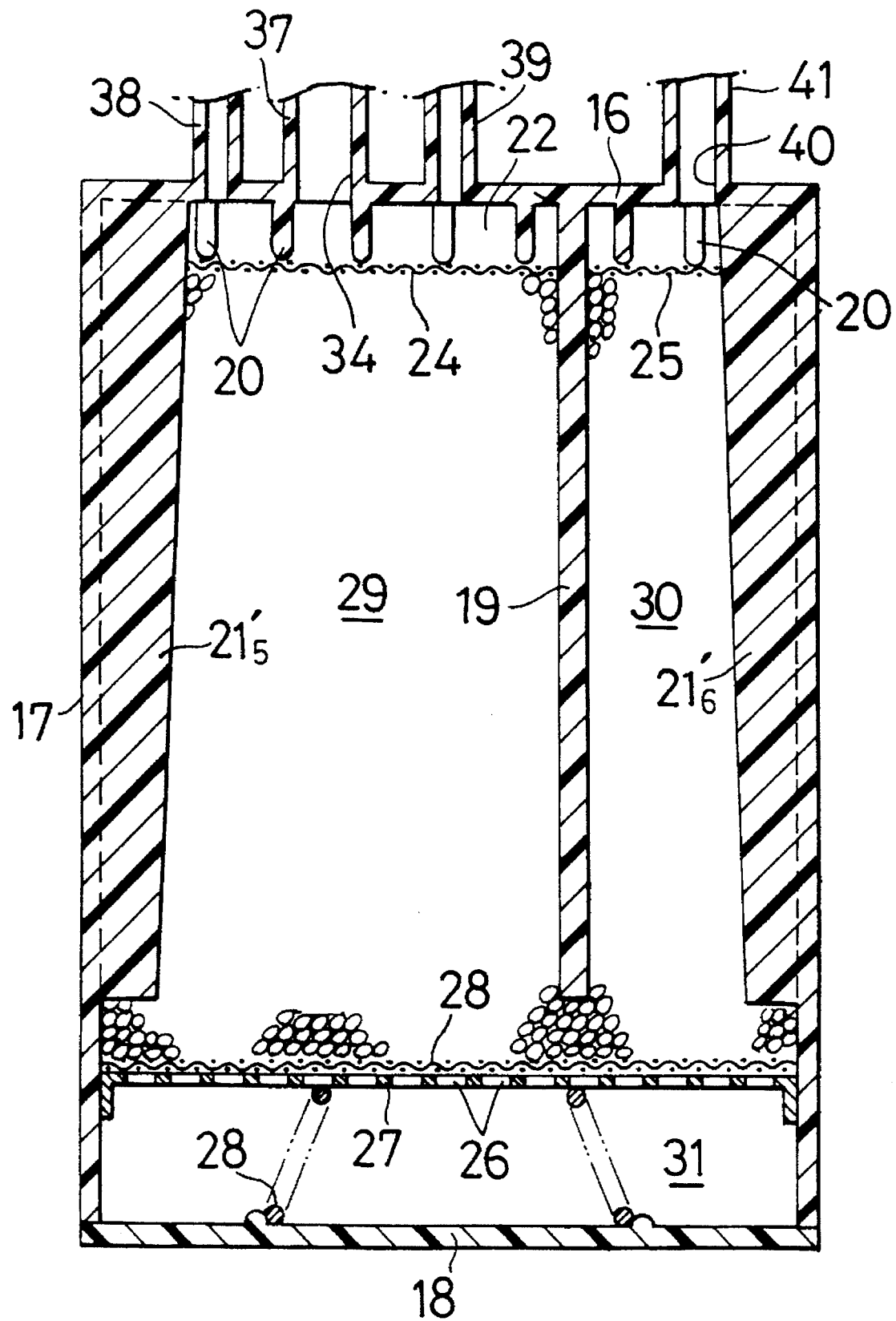
FIG. 11 is a vertical sectional view of a canister according to a fourth embodiment of the present invention.
Figure 12:
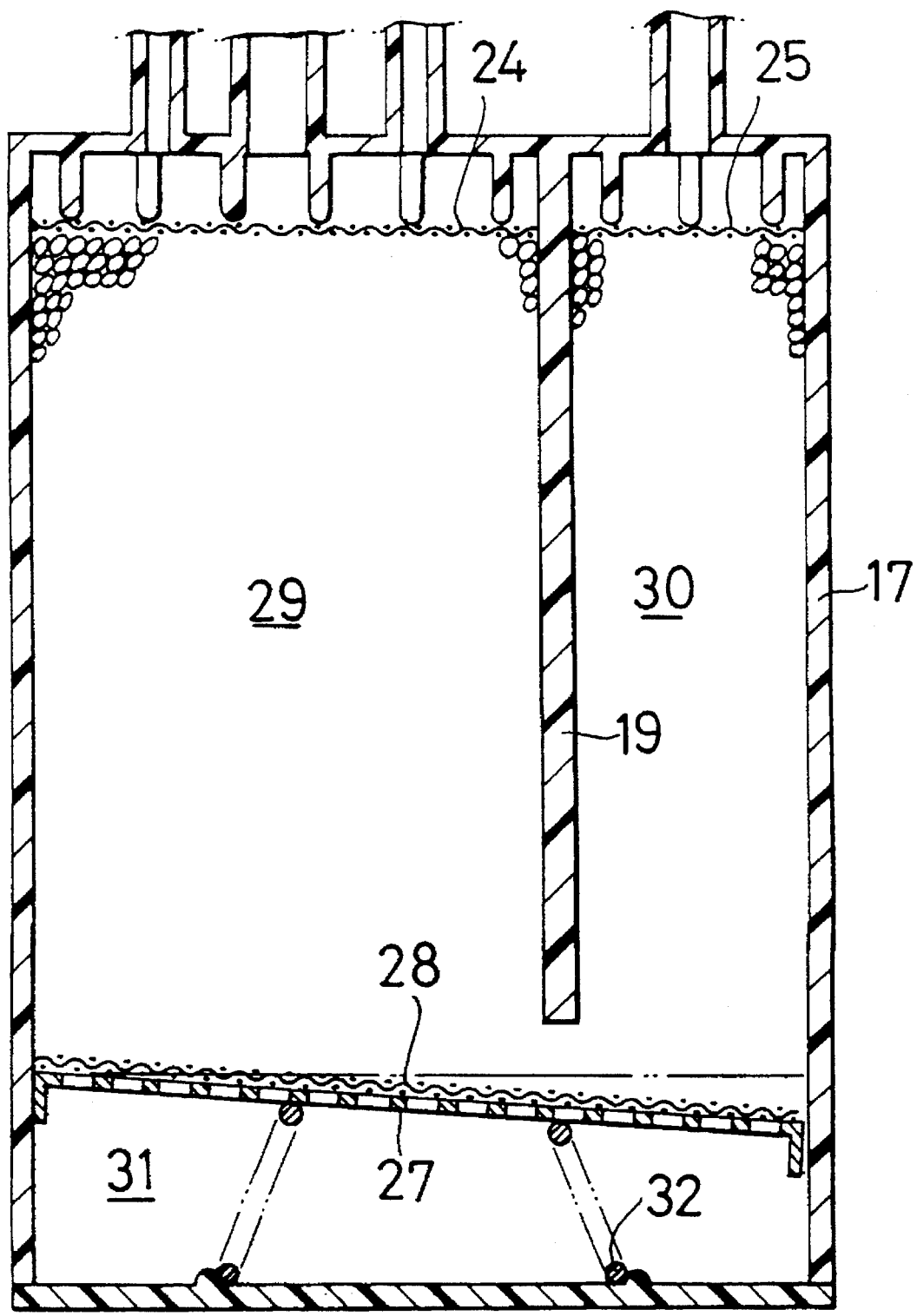
FIG. 12 is a vertical sectional view of the known canister.

FIG. 11 shows a canister according to a fourth embodiment of the present invention. An inclination inhibiting portion $21_5'$ is integrally connected at right angles to the entire length of the inner surface of the casing body 17 on the side of the first chamber 22 to protrude toward the partition wall 19. The inclination inhibiting portion $21_5'$ extends toward the lid member 18 with one end thereof being connected to the end wall 16. An inclination inhibiting portion $21_6'$ is integrally connected at right angles to the entire length of the inner surface of the casing body 17 on the side of the second chamber 23 to protrude toward the partition wall 19. The inclination inhibiting portion $21_6'$ extends toward the lid member 18 with one end thereof being connected to the end wall 16. Moreover, the other ends of the inclination inhibiting portions $21_5'$ and $21_6'$ are disposed at locations spaced at substantially the same distance apart from the third filter 28 as the distance between the partition wall 19 and the third filter 28. The inclination inhibiting portions $21_5'$ and $21_6'$ are formed in a manner that they protrude from the inner surface of the casing body by a larger amount at a location closer to the end wall 16.

In the fourth embodiment, an effect similar to that in each of the above-described embodiments can be provided by the inclination inhibiting portions $21_5'$ and $21_6'$ and in addition, when the casing body 17 is formed in a molding manner from a synthetic resin to integrally have the inclination inhibiting portions $21_5'$ and $21_6'$ it is easy to draw the mold downwardly as viewed in FIG. 1, leading to an enhanced moldability.

Although the embodiments of the present invention have been described in detail, it will be understood that the present invention is not limited to the above-described embodiments, and various modifications in design may be made without departing from the spirit and scope of the invention defined in the claims.

For example, the casing body may be circular in cross section.

What is claimed is:

1. A canister, comprising:
    a casing including
        a casing body formed into a bottomed tubular shape with an end wall at one end thereof, and
        a lid member for closing the other end of said casing;
    a partition wall which extends toward the lid member, one end of the partition wall connected to said end wall, opposite sides of the partition wall are connected to an inner surface of said casing body;
    first and second filters fixedly disposed within said casing body on opposite surfaces of said partition wall, wherein first and second chambers are formed between said first and second filters and said end wall, respectively;
    support plate fitted to the other end of said casing body, said support plate has a large number of communication bores permitting a gas to flow therethrough;
    a third filter superposed and carried on an inner surface of said support plate, said third filter being disposed at a distance from the other end of said partition wall;
    first and second adsorbent layers, formed by adsorbents, are retained between said first and second filters and said third filter, respectively;
    a third chamber defined between said support plate and said lid member;
    a spring, accommodated with said third chamber, for biasing said support plate in a direction to compress said first and second adsorbent layers; and
    an inclination inhibiting portion provided on at least one of said casing body and said partition wall, said inclination inhibiting portion provided on an opposite side from said third chamber with respect to said third filter and said support plate, wherein a distance between said inclination inhibiting portion and said third filter substantially corresponds to a distance between said third filter and said partition wall.

2. A canister according to claim 1, wherein said casing body is formed from a synthetic resin, and said inclination inhibiting portion being formed on and protruded from the inner surface of said casing body over an entire length of the casing body such that a protruding amount of said inclination inhibiting portion is larger toward said end wall.

3. A canister according to claim 1, wherein said inclination inhibiting portion is integrally connected at opposite sides to the inner surface of the casing body and extends in parallel to said partition wall, and one end of said inclination inhibiting portion is connected to the end wall of the casing body.

4. A canister according to claim 1, wherein said inclination inhibiting portion has sides connected between said partition wall and an inner surface of the casing body and said inclination inhibiting portion has one end connected to the end wall of the casing body.

5. A canister according to claim 1, wherein said inclination inhibiting portion has one side integrally connected to an inner surface of the casing body to protrude toward said partition wall, and has one end connected to the end wall of the casing body.

6. A canister according to claim 5, wherein said inclination inhibiting portion is formed in each of said first and second chambers.

7. A canister according to claim 5, further comprising a pair of inclination inhibiting portions are provided parallel to the partition wall and each have a side connected to an inner surface of the casing body.

8. A canister according to claim 6, wherein a pair of inclination inhibiting portions are provided parallel to the partition wall and each have a side connected to an inner surface of the casing body and wherein said pair of inclination inhibiting portions are provided in both said first and second chambers.

9. A canister according to claim 1, wherein said inclination inhibiting portion has a side connected to said partition wall, and an end connected to said end wall of the casing body.

10. A canister according to claim 9, wherein said inclination inhibiting portion is provided in said first chamber.

11. A canister according to claim 10, further comprising another inclination inhibiting portion provided in said second chamber, wherein said another inclination inhibiting portion has one side integrally connected to an inner surface of the casing body to protrude toward said partition wall, and has one end connected to the end wall of the casing body.

12. A canister according to claim 1, wherein a pair of inclination inhibiting portions are provided parallel to the partition wall and each have a side connected to an inner surface of the casing body.

13. A canister according to claim 12, wherein said pair of inclination inhibiting portions are provided in both said first and second chambers.

* * * * *